United States Patent [19]

Hoffman

[11] 3,789,325

[45] Jan. 29, 1974

[54] VARIABLE FREQUENCY AND COUPLING EQUALIZER AND METHOD FOR TUNING

[75] Inventor: Murray Hoffman, Livingston, N.J.

[73] Assignee: International Telephone and Telegraph, Nutley, N.J.

[22] Filed: Nov. 24, 1971

[21] Appl. No.: 201,670

[52] U.S. Cl. .......... 333/28 R, 324/58 R, 333/31 A, 333/83 R

[51] Int. Cl. .......... H03h 7/16

[58] Field of Search... 333/28 R, 31 A, 83 R, 73 W, 333/1.1, 24.2

[56] References Cited

UNITED STATES PATENTS

| | | | |
|---|---|---|---|
| 3,159,803 | 12/1964 | Czubiak et al. | 333/83 R |
| 3,466,573 | 9/1969 | Abele et al. | 333/28 R |
| 2,603,754 | 7/1952 | Hansen | 333/73 W X |
| 2,954,536 | 9/1960 | Mueller | 333/73 W |
| 3,287,667 | 11/1966 | Boutelant | 333/28 R |
| 3,444,474 | 5/1969 | Borenstein et al. | 333/28 R X |
| 3,095,546 | 6/1963 | Ayres et al. | 333/24.2 |
| 3,422,438 | 1/1969 | Marston | 333/1.1 UX |
| 3,519,958 | 7/1970 | Hagler et al. | 333/24.2 X |
| 3,699,480 | 10/1972 | Mueller | 333/28 R |

OTHER PUBLICATIONS

Southworth, Principles & Applications of Waveguide Transmission, Van Nostrand Co., Princeton, N.J., 1950, Title page & p. 255

*Attorney, Agent, or Firm*—John T, O'Halloran, Menotti J. Lombardi; Alfred C. Hill al.

[57] ABSTRACT

There is provided a variable equalizer adapted for operation in a communications system employing waveguide frequencies with a bandwidth of for example 500 MHz. The variable equalizer comprises a unique cavity arrangement in which substantially independent adjustments are provided for varying the cavity resonant frequency and the signal energy coupling thereto. The cavity is in turn coupled to the middle port of a three-port circulator which constitutes part of a transmission line for the signal energy. The arrangement is adaptable to have a plurality of circulators directly coupled together to form the transmission line, with each being provided with a separate one of the unique dual-adjustable cavity arrangements. In this way, equalization may be provided over extremely wide ranges of operating frequencies. A unique method is also disclosed for tuning such a variable equalizer to provide a substantially flat response across the entire intended operating band of frequencies.

7 Claims, 26 Drawing Figures

INVENTOR
MURRAY HOFFMAN
BY Mark L. Hopkins
AGENT

INVENTOR
MURRAY HOFFMAN
BY
AGENT

INVENTOR
MURRAY HOFFMAN
BY [signature]
AGENT

PATENTED JAN 29 1974 | 3,789,325

SHEET 4 OF 8

INVENTOR
MURRAY HOFFMAN
BY [signature]
AGENT

TEST CAVITY, GROUP DELAY VS FREQUENCY

THEORETICAL SYNTHESIS OF CONSTANT DELAY

INVENTOR
MURRAY HOFFMAN
BY [signature]
AGENT

SIMULATION OF SYSTEM GROUP DELAY BY VARIABLE EQUALIZER

INVENTOR
MURRAY HOFFMAN
BY
AGENT

INVENTOR
MURRAY HOFFMAN
BY [signature]
AGENT

EQUALIZER SHORTED

TUNING CAVITY #1

TUNING CAVITY #1, PIN & PLUNGER TO NO.1 POSITION

TUNING CAVITY #2

TUNING CAVITY #2

TUNING CAVITY #3

ALL 8 CAVITIES TUNED FIRST TRY

AFTER RETUNING CAVITIES 1-4

CAVITY #5 BEING RETUNED

EQUALIZER TUNED

INVENTOR
MURRAY HOFFMAN
BY [signature]
AGENT

VARIABLE FREQUENCY AND COUPLING EQUALIZER AND METHOD FOR TUNING

BACKGROUND OF THE INVENTION

This invention relates to apparatus for providing equalization in communications systems, and more particularly to variable equalizers capable of broadband operation primarily at waveguide frequencies, typically 500 MHz wide, and a method for tuning such variable equalizers.

Delay, or phase, distortion deteriorates the performance of communications systems. A common method of improving the system performance is to compensate the delay over the narrow band of the system i-f chain with an equalizer. If the system must for example operate anywhere within a broad shf band, such as the military satellite band, then the equalizer must be readjusted in the i-f channel every time the carrier frequency is moved appreciably. The group delay varies over the shf band due to the predictable behavior of the various band pass and band reject filters in the system transmit or receive chains. A fixed equalizer can be designed once and for all to compensate these delay variations over the whole shf band and then the i-f equalizer need not be readjusted each time the carrier frequency is changed. The system now has frequency agility.

There are system components, however, producing group delays which are not predictable. These include waveguide transmission lines whose lengths are unknown for example until system installation; also high powered amplifier tubes, parametric or tunnel diode amplifiers, and so forth. If the system is to change carrier frequency without the need for re-equalization, the sum of the delays contributed by these components must be measured at the installation; a variable equalizer would be required as part of the system, which equalizer must be capable of providing a wide range of delay shapes, with adjustability to flatten the delay over the entire operating band.

SUMMARY OF THE INVENTION

It is an object of this invention to provide equalization apparatus and a method of tuning such apparatus.

It is also an object of this invention to provide a variable equalizer of waveguide frequency design capable of providing a wide range of delay shapes and compensating shf delays over a very broad band, typically 500 MHz.

Delay is equalized by a transmission network having an all-pass characteristic. The poles and zeros of such networks are disposed in the S plane with quadrantal symmetry. That is, if there is a 0 at $S = \alpha_1 + j\omega_1$, then there is a 0 at $S$ conjugate, denoted as $S^*$. Two poles complete the quadrupole and are located at $-S$ and $-S^*$. It is easy to show that for $S = j\omega$ and $\omega$ varying, no amplitude variations occur in the transmitted signal; only a variation in phase is experienced.

The poles and zeros of the reflection coefficient of a cavity have quadrantal symmetry so that if a signal could be applied to the input port of a circuit, experience a reflection from a cavity, and emerge from an output port, the circuit would only shift the phase of the signal.

It is therefore another object of this invention to provide a variable equalizer in which the transmission circuit for a quadrupole section utilizes a cavity and an input-output circuit such as a circulator.

It is desirable that a variable equalizer consist of a number of cavities connected in cascade through circulators, wherein the positions of the poles and zeros of the cavities are adjustable to shape the resulting phase or delay curve. The circulator design has the advantage of being simpler to implement than hybrid coupled cavity arrangements for example. Also, cavities can be laid out in straight lines without the need for bends between sections. It is entirely possible, however, to cascade a number of separate cavities "around a corner" or to provide other configurations necessitated by the dictates of installation requirements (such as limited cabinet space) by wave-guide coupling between circulators where desirable.

It is a further object of this invention, therefore, to provide a variable equalizer in accordance with the above-mentioned properties.

It is yet another object of this invention to provide a variable equalizer in which the elements that go to make up a particular compensating delay response are the delay resonance curves of a number of cavities having different peak delays and different resonant frequencies, and in which provision is made for substantially independent variation of the signal coupling and the resonant frequencies of the cavities.

According to the broader aspects of the invention, there is provided a variable equalizer comprising first means providing a cavity operatively coupled to a source of signal energy, means for vrying the resonant frequency of the cavity, and means for varying the coupling of the signal energy to the cavity, the means for varying the resonant frequency and the means for varying the coupling providing substantially independent variable control of the equalizer.

There is also provided, according to the invention, a method for tuning a multi-sectional variable equalizer to achieve a predetermined (e.g., substantially constant) group delay response in a communication system over a broad band of operating frequencies, in which each section of the equalizer has first and second adjustment controls for substantially independently varying respectively the resonant frequency and signal energy coupling thereof, comprising the steps of: adjusting the first and second controls of all the equalizer sections to predetermined reference settings; setting the second adjustment control of a first equalizer section to a predetermined initial setting and varying the associated first adjustment control until a delay response is effected; coarse tuning the first and second controls of the first section to effect the response therof at a predetermined portion of the system operating frequency spectrum and to within a predetermined range of response levels; repeating the adjusting and setting steps above for each of the remaining sections of the multi-sectional equalizer such that each section is associated with a separate portion of the entire system operating frequency spectrum and within the predetermined range of response levels; and fine tuning each of the sections to the desired collective response, (e.g., to the average of the high and low portions thereof). Moreover, a novel method for determining the proper configuration of the adjustable signal energy coupling means for the desired system operating characteristics is disclosed.

A feature of the invention is that it may be utilized to simulate the known or measured group delay characteristics of a communication system, thus making it considerably easier, for experimental and test purposes, to work with the equalizer than the entire system.

A further feature of the invention is that the number of sections, consisting of the novel cavity arrangement together with a suitable input-output device, of a multi-sectional waveguide equalizer employing the inventive concepts may be varied according to the frequency spectrum and other requirements of the contemplated communication system.

BRIEF DESCRIPTION OF THE DRAWINGS

The above-mentioned and other objects and features will become more apparent, and the invention itself better understood, by reference to the following description taken in conjunction with the accompanying drawings, comprising FIGS. 1–11, in which.

DESCRIPTION OF THE PREFERRED EMBODIMENTS

The reflection coefficient response of a cavity is represented by a quadrupole in the $S$ plane consisting of two poles and two zeros. The phase $\phi$ of the reflection varies as $S$ moves along the $+j\omega$ axis according to $$\phi = \sum_{\text{zeros}} \arg (S - S_{0i}) - \sum_{\text{poles}} \arg (S - S_{\text{pole } n}).$$

Figure 1A:
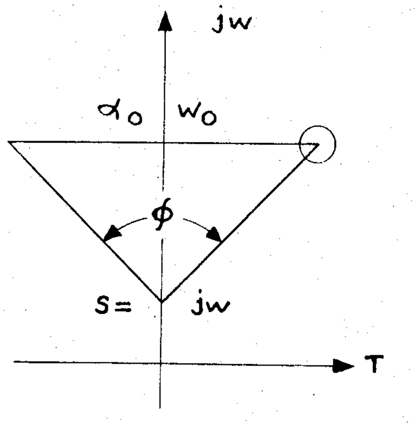
FIGS. 1A and 1B are diagrams of respectively the S-plane (pole-zero) representation of a single cavity reflection coefficient and the group delay response (group bandwidth) thereof.

At microwave frequencies, the pole and 0 in the lower half of the $S$ plane are so far away from values of $S$ in the band that all their angles are sensibly 90° and these pole and 0 angles cancel. Thus the phase is determined principally by the pole and 0 in-band near the resonance frequency. An examination of the geometry given in FIG. 1A shows that $\phi$ is the angle included between the pole, the 0 and $S$. Consequently if the 0 is located at $S_o = \alpha_o + j\omega_o$, then $\phi$ can be expressed as:

$$\phi = 2 \tan^{-1} (\alpha_o/\omega_o - \omega). \quad (1)$$

Since $\phi$ is the included angle it varies from 0 to $2\pi$ as $\omega$ goes from 0 to $\infty$.

Group delay, $\tau(\omega)$, is the first derivative of the phase with respect to $\omega$.

$$\tau(\omega) = d\phi/d\omega = [2\alpha_o/\alpha_o^2 + (\omega_o - \omega)^2] \quad (2)$$

At the resonant frequency of the cavity, $\omega=\omega_o$; and the group delay is a maximum.

$$\tau(\omega_o) = \tau_{max} = 2/\alpha_o \quad (3)$$

Figure 1B:
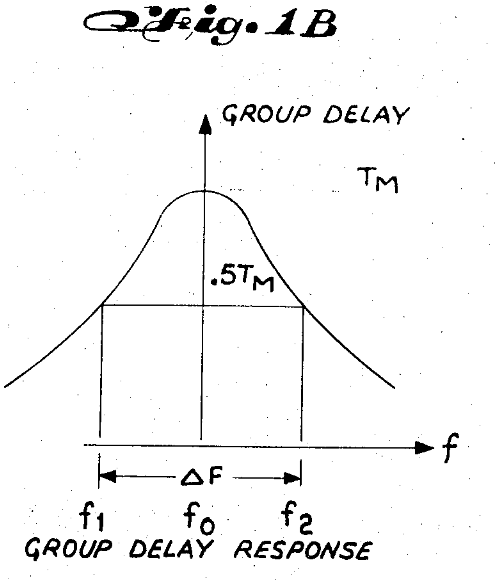

It is intended to relate $\tau_{max}$ to the half group delay bandwidth, $\Delta F$ (FIG. 1B). Corresponding to this is a $\Delta\omega$, where $$\Delta\omega = 2\pi\Delta F.$$

At the half group delay height, the lower $\omega=\omega_o - \Delta\omega/2$. To find $\tau[\omega_o - (\Delta\omega/2)]$, which must be half the peak delay, $\tau_{max} = 2/\alpha_o$, or $1/\alpha_o$:

$$1/\alpha_o = \tau\, [\omega_o - (\Delta\omega/2)] = \{2\alpha_o/\alpha_o^2 + [\omega_o - \omega_o + (\Delta\omega/2)]^2\} \quad (4)$$

Equating the first expression to the last and solving for $(\Delta\omega/2)$:

$$\Delta\omega/2 = \alpha_o \quad (5a)$$

Now, by definition, $\Delta\omega/2 = \pi\Delta F$

Consequently:

$$\alpha_o = \pi\Delta F. \quad (5b)$$

Further:

$$\alpha_o = 2/\tau_{max}, \text{ so consequently}$$

$$\tau_{max} = 2/\pi\Delta F. \quad (6)$$

This is the relationship between the peak group delay and the half group delay bandwidth sought.

If equation (2) is expressed in terms of frequency, and equations (3) and (6) are substituted into it, a normal form for $\tau$ is expressed as a function of frequency $f$:

$$\tau(f) = [\tau_{max}/1 + (F_o - f/\Delta F/2)^2] \quad (7)$$

$F_o$ is the cavity resonant frequency and $\Delta F$ was defined as the half delay bandwidth.

Figures 2, 5:
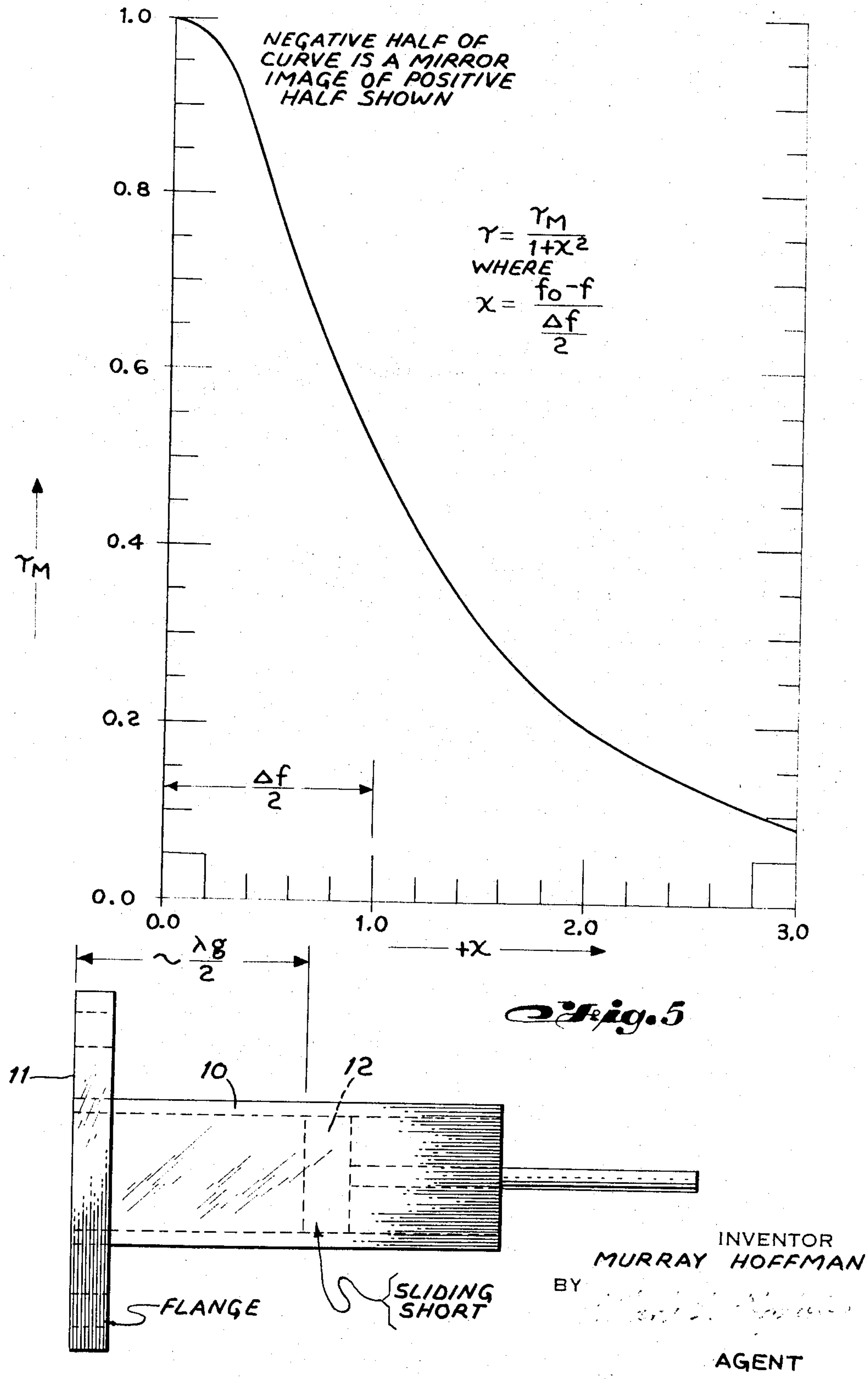
FIG. 2 is a graphical representation of normalized group delay of a single cavity.
FIG. 5 is a simplified diagrammatic representation of a cavity test fixture.

Letting $$X = F_o - f/\Delta F/2, \tag{8}$$

the expression for normalized group delay can be plotted for the normalized $X$. This is shown in FIG. 2.

It is useful to determine the area under the group delay curve between the half group-delay frequencies.

$$A = \int_{\omega_0 - \Delta\omega/2}^{\omega_0 + \Delta\omega/2} \tau(\omega)d\omega = 2\int_0^{\omega_0 + \Delta\omega/2} \frac{2\alpha_0}{\alpha_0^2 + (\omega_0 - \omega)}\, d\omega \tag{9}$$

symmetry.

Integrating (9), the result is $$A = \pi. \tag{10}$$

This result is useful when measuring the group delay of a single cavity, and it is desired to check that the measurement is accurate. The total area under the curve is twice $A$ or $2\pi$. This is the total phase shift which can be contributed by a cavity reflection.

From the literature, i.e., Cohn, S.B., and Torgow, E.N., "Investigation of Microwave Phase and Time Delay Equalizers," Report 1 prepared for U.S. Army Electronics Laboratories, Fort Monmouth, N.J., by Rantec Corporation under Contract No. DA 28-0430 AMC-00111CE), Aug. 31, 1964, we find that Cohn has derived expressions for a single cavity based on the equivalent circuit of a cavity. Using the present notation, his results are $$\Delta F = F_o/Q_{ex}, \tag{11}$$

where $Q_{ex}$ is the external $Q$ of the cavity, and $$\tau M = (2/\pi)\,(Q_{ex}/F_o) \tag{12}$$

Equating (11) and (12), there is obtained:

$$M = (2/\pi)\,(1/\Delta F), \tag{13}$$

which is the same as equation (6) derived hereinbefore.

The analysis here presented is useful for general synthesis of group delay shapes using multiple cavities. It is more convenient to measure and analyze in terms of group delay than non-linear phase. Measurement techniques are based on the definition of group delay and these are described in the following. Also described is the conversion procedure for converting group delay to non-linear phase.

In the measurement of group delay and estimation of phase non-linearity, it is intended here that the group delay of each section in tandem of a variable equalizer be measured and plotted on a recorder. The resulting curve can be integrated in very fine strips on a computer to produce a computer drawn curve of phase to demonstrate linearity. The modern swept signal sources are much more amenable to measurement of group delay than of direct microwave phase, and because they are much more efficient and economical than point-by-point measurements, the group delay method is the more desirable and will be described herein.

Consider a two port device, such as the combination of an equalizer and a filter, through which the group delay is to be measured at the radian frequency $\omega$ by transmitting a test signal through the device. The test signal is a carrier at the frequency $\omega$ that is amplitude modulated by a tone at the suitably low modulating frequency $\Delta\omega$, to an extent described by the modulation index $m$. The test signal can be expressed in terms of its three spectral components; it is proportional to $e(t) = \cos \omega t = m/2 \cos (\omega + \Delta\omega)t = m/2 \cos (\omega - \Delta\omega)t.$ Because the device is dispersive, it will have a phase lag $\theta(\omega)$ that does not merely increase in direct proportion to frequency. The phase affects each signal component differently; the outout signal is proportional to $v(t) = \cos [\omega t - \theta(\omega)] + m/2 \cos [(\omega + \Delta\omega)t - \theta(\omega + \Delta\omega)] + m/2 \cos [(\omega - \Delta\omega)t - \theta(\omega - \Delta\omega)] = \cos [\omega t - \theta(\omega)] + m \cos\{\omega t - ½ [\theta(\omega + \Delta\omega) + \theta(\omega - \Delta\omega)]\}\cdot \cos \{\Delta\omega t - ½ [\theta(\omega + \Delta\omega) - \theta(\omega - \Delta\omega)]\}$ The phase of the last term is $½ [\theta(\omega + \Delta\omega) - \theta(\omega - \Delta\omega)] = \Delta\omega [\theta(\omega + \Delta\omega) - \theta(\omega - \Delta\omega)/2\Delta\omega]$ $$\approx \Delta\omega\,[d\theta(\omega)/d\omega] \equiv \Delta\omega t_d(\omega),$$

in which $t_d(\omega)$ is the desired group delay. The approximation is good if $\Delta\omega$ is a small enough fraction of the passband of the device under test. Under the same condition, the phase of the next to last term becomes $$½ [\theta(\omega + \Delta\omega) + \theta(\omega - \Delta\omega)] \approx \theta(\omega),$$

so that the output signal can be written $v(t) = \{1 + m \cos \Delta\omega\,[t - t_d(\omega)]\} \cos [\omega t - \theta(\omega)].$ The modulation of the test signal is evidently delayed by an amount equal to the group delay. Group delay can be determined by detecting the modulation of the output signal and measuring its delay, or for tone modulation, its phase shift divided by the modulating frequency.

If:

$$½ [\theta(\omega + \Delta\omega) - \theta(\omega - \Delta\omega)] = \phi_e,$$

$$\tau(\omega) = t_d$$

and $\Delta\omega = 2\pi, f_m$, then:

$$t_d = (\phi_e/f_m\ x\ 360°),$$

where $\phi_e$ = envelope phase shift in degrees $f_m$ = modulation frequency in hz $t_d$ = group delay in seconds.

Table 1

Group Delay Calibration Factor

| Calibration Factor $t_d/\phi_e$ | Modulation Frequency $f_m$ (MHz) |
|---|---|
| 0.5 | 5.555 |
| 1.0 | 2.778 |
| 1.5 | 1.852 |
| 2.0 | 1.389 |
| 139.0 | 0.020 |

In the course of experimental work on the inventive variable phase equalizer disclosed herein, it was found that the following techniques improve the accuracy of group delay measurements.

Figure 3:
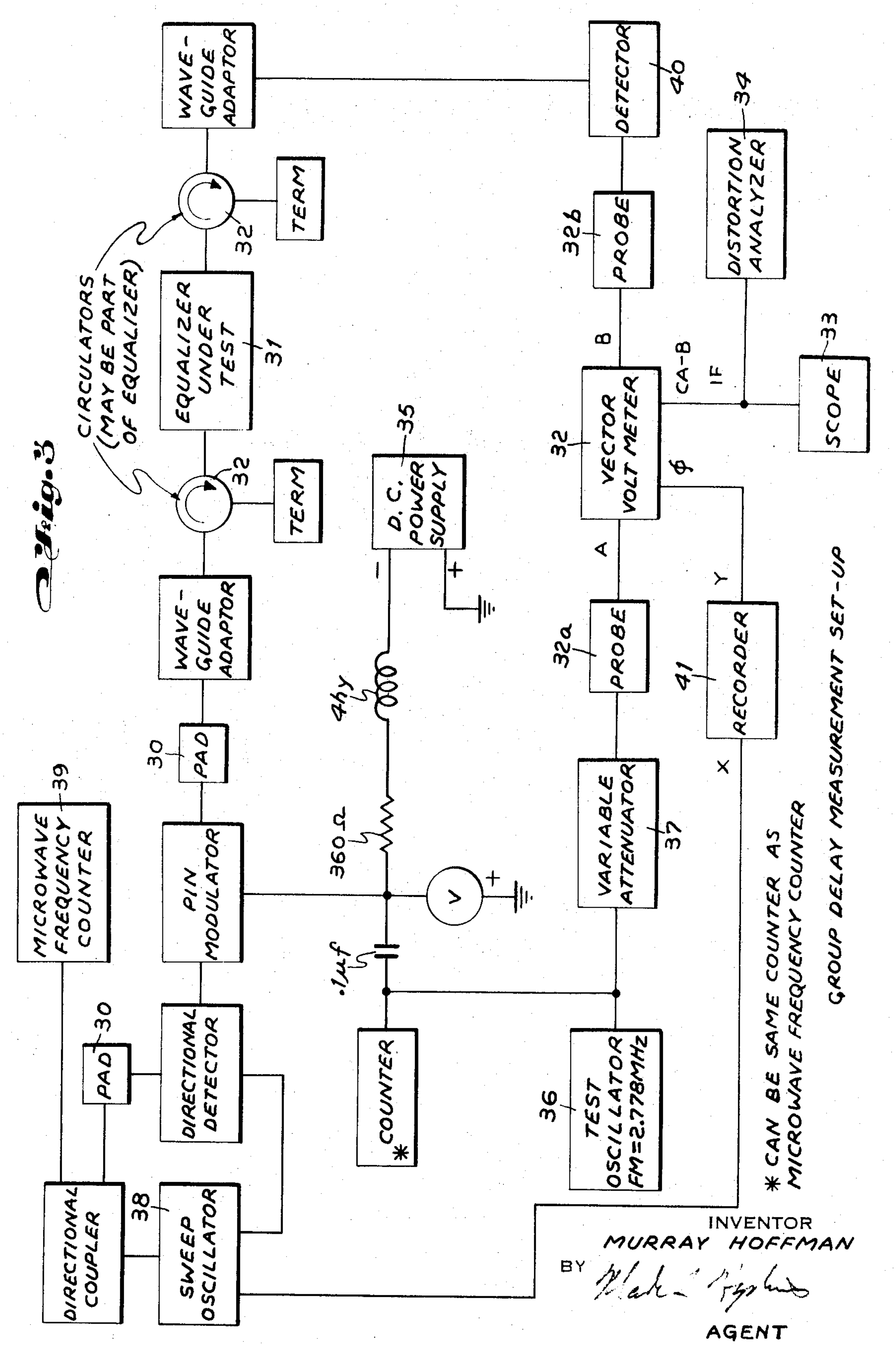
FIG. 3 is a block schematic diagram illustrating a test arrangement for measuring group delay.

The block diagram of FIG. 3 represents the preferred test set up for measuring actual group delay. If the unit under test is an equalizer 31, the two circulators 32 connected as isolators are generally incorporated in the equalizer, and are not required. (See FIG. 8, elements *7a* and *7b*). In addition, the following should be observed:

1. Good quality pads 30 should be used, such as Weinschel Type 210A.

2. The 20.0 KHz i-f channel A and B in the Vector Voltmeter 32 should be a pure sine wave. This signal, available on the back of the Vector Voltmeter 32, can be monitored by either a scope 33 or distortion analyzer 34. I have found that adjusting the power supply 35 voltage and the output level of the test oscillator 36 for an optimum sine wave on Channel B will also give an optimum sine wave for Channel A. Generally, the reading on the voltmeter 32 in FIG. 3 is –0.4 volts.

3. Use of a slow sweep speed (greater than 10 seconds) is appropriate.

4. Using a modulation frequency of 2.778 MHz allows the Vector Voltmeter 32 to be directly read in group delay.

5. Ensure that the attenuator 37 in the Channel A arm of the Vector Voltmeter 32 is adjusted, so that the Channel A and Channel B amplitudes are within 10 db.

6. The sweeper 38 should always be leveled.

7. If a microwave frequency counter 39 is not available, and a wave meter is used for frequency calibration, the wavemeter should not be kept in the main r-f path during a group delay measurement. The wavemeter causes group delay ripple.

8. The Vector Voltmeter probes *32a* and *32b* are very sensitive to physical movement. The probe should be placed in the holder provided on the instrument, and a short cable attached instead from the probe *32b* to the detector 40 on channel B.

9. Moreover, all equipment should be grounded directly. Equipment grounds should not be through the shield of a coaxial cable.

10. If a variable persistence scope is used instead of a recorder 41, then the blanking output pulse of the sweeper 38 is used to avoid retrace on the scope. However, an invertor must be inserted between the sweeper 38 and scope 33 because the output pulse of the sweep is $-4v$ and the scope requires a minimum of $+2v$ for blanking.

It has been shown that the group delay $\tau(\omega)$ is given by:

$$\tau(\omega) = t_d(\omega) = (d/d\omega)\ [\theta(\omega)]$$

Consequently the phase is found by integration:

$$\theta(\omega) = \int_{\omega_1}^{\omega} t_d(\omega)d\omega + C$$

Suppose the group delay $t_d(\omega) \equiv \tau(\omega)$ is approximately given by a sinusoid as will most often occur when tuning for equal ripple. Then $$t_d(\omega) = A \cos\ [2\pi\ (f-f_1)/\delta]$$

where $A$ = peak group delay ripple in seconds $\delta$ = period of the ripple in hz.

Specifications are often in hz rather than radians so the equations become $$\theta(f) = 2\pi \int_{f_1}^{f} A \cos \frac{2\pi(f-f_1)}{\delta}\, df$$

$$\theta(f) = 2\pi A\ (\delta/2\pi) \sin\ (2\pi\ (f-f_1)/\delta] = \delta A \sin\ [2\pi\ (f-f_1)/\delta]$$

This shows that the peak phase excursion from linearity is the product of the peak group delay ripple and its ripple period.

Equation (3) showed that there is an inverse proportionality between the maximum delay, $\tau_{max}$, and the real part of the all pass pole position, that is, $$\tau_{max} = 2/\alpha_o. \quad (3)$$

The elements that go to make up a particular compensating delay response are the delay resonance curves of a number of cavities having different peak delays $\tau_{max}$ and different resonant frequencies $\omega_o$. These are arranged across the band to provide a delay shape and are coupled to the signal to be equalized through a transmission device. Therefore means are required to assemble the transmission device and to substantially independently vary the coupling and resonant frequencies of the cavities.

Figure 4:
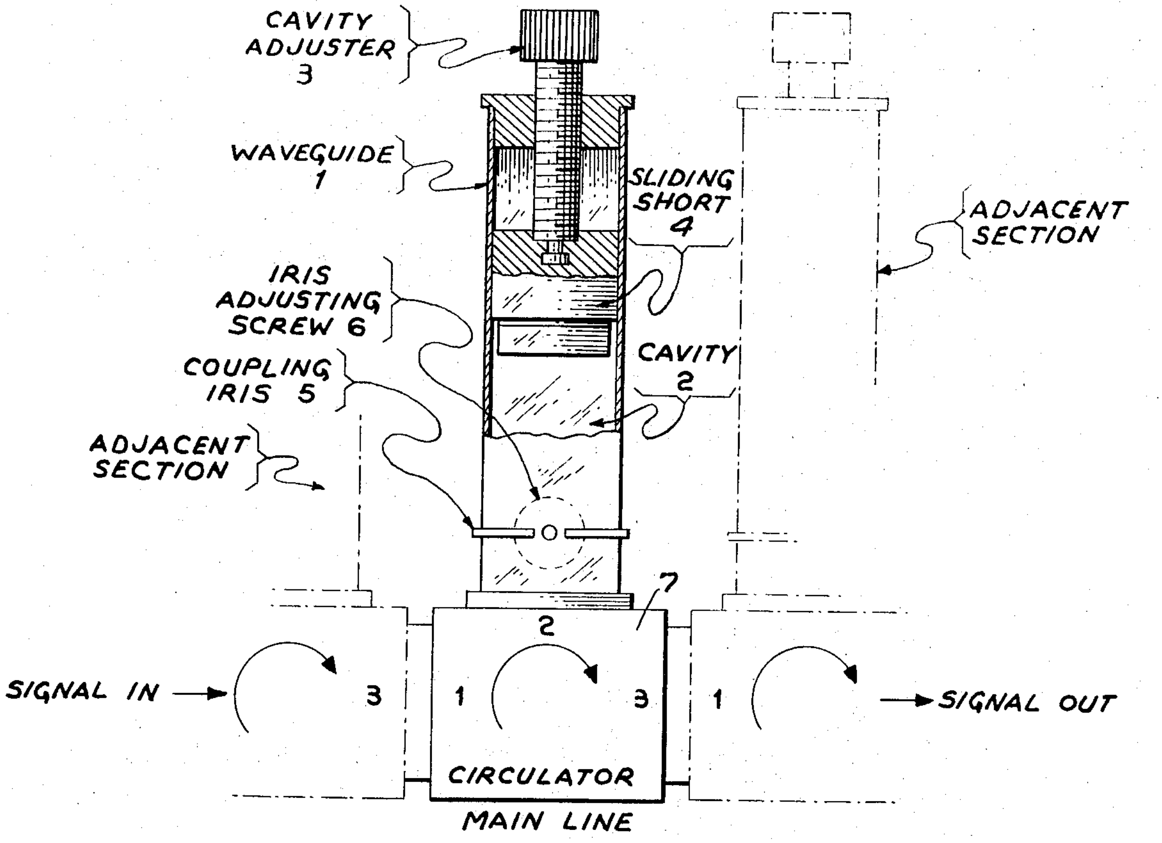
FIG. 4 is a diagrammatic representation of one of a chain of cascaded variable equalizers according to the invention, and particularly illustrating the inventive cavity arrangement.

The pole-zero representation shown in FIG. 1A is for a cavity reflection coefficient. Thus it is intended that the inventive all-pass structure take the form of a circulator terminated in port 2 by a cavity. Means are needed to vary $\alpha_o$ and $F_o$ of the cavity. The cavity decrement $\alpha_o$ is to be varied by changing coupling to the main transmission line. This transforms varying amounts of the main line characteristic impedance (purely real) into the cavity circuit and thus varies its $Q$. Of the many ways in which the cavity coupling may be varied, a screw moving in the plane of an iris is most economical to construct and, when necessary, to pressurize, and is known to work properly over the intended operating band. The resonant frequency $F_o$ of a waveguide cavity is varied by a sliding short as shown in FIG. 4, which illustrates in detail one of a chain of cascaded circulators with the inventive cavity arrangement associated therewith.

A piece of rectangular waveguide 1 is coupled at one end to the middle or No. 2 port of a three-port circulator 7. The waveguide 1 is provided at the free end thereof with a sliding short 4 which is controlled by a cavity adjuster 3 for changing the resonant frequency of the cavity 2. The arrangement is also provided with a coupling iris 5 having an iris adjusting screw 6 operatively positioned in the plane thereof near the coupling to the circulator 7. The adjustable iris serves to vary the coupling of the signal energy between the circulator 7 and the cavity 2 as formed between the sliding short 4 and the iris 5. Additional circulators (as shown in dashed lines in FIG. 4) are coupled together in cascade to form a main line, with respective waveguide cavities coupled thereto which are arranged and constructed as described above.

Ideally the coupling and frequency adjustments in a cavity should be independent. Experience shows that largely they are. However coupling the cavity 2 more strongly by driving in the iris screw 6 lowers the frequency somewhat, while raising the frequency by moving in the short 4 lowers the peak group delay response. These effects are small, and when fine tuning, the experienced technician rapidly learns to operate one tuning control against the other.

By adjusting the short 4, and tuning screw 6, a wide variation in group delay can be obtained. I have found for instance that very satisfactory results of tuning a single cavity, such as that illustrated schematically in FIG. 4, are obtainable as indicated in the following:

first to 7.75 GHz with group delay of 21 nsec, then
to 7.25 GHz with group delay of 21 nsec, then
to 7.25 GHz with group delay of 2 nsec, then
to 7.75 GHz with group delay of 2 nsec.

To construct a waveguide variable equalizer the proper iris size must be selected to provide sufficient group delay variation. The following preferred procedure of selection may be employed, wherein the frequency band, waveguide size, and variation of group delay desired (10:1 ratio maximum) are already known or determined.

1. A test fixture should be fabricated consisting of a waveguide 10 with a flange 11 on one end and a variable sliding short 12 on the other. The distance from the flange 11 to the short 12 should be approximately $\lambda_g/2$ at the lowest frequency. See FIG. 5.

Figure 6B:
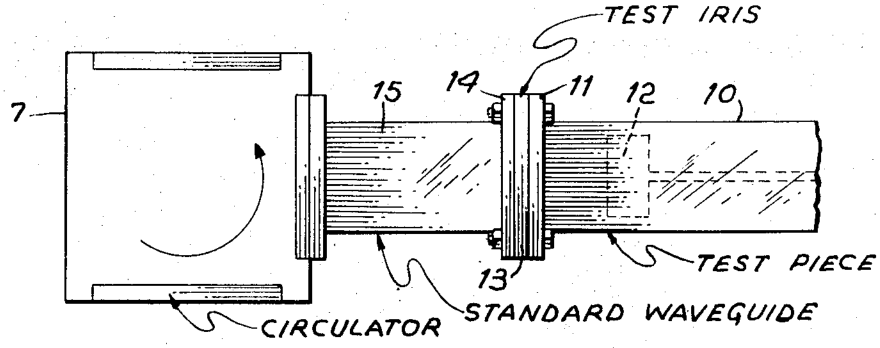
FIGS. 6A and 6B diagrammatically represent respectively a typical iris and an iris test assembly.

2. Next, a series of test irises should be fabricated, such as iris 13 in FIGS. 6A and 6B, that can be mounted in an assembly consisting of the flange 11 of the test piece 10 and the flange 14 of a waveguide 15 connected to a circulator (FIG. 6B). The opening 13*a* of the irises should lie between 0.2 and 0.5 of the wide dimension of the waveguide.

3. Place the test assembly of FIG. 6B containing an iris into a group delay measuring setup as described hereinbefore with reference to FIG. 3.

4. Move the sliding short 12 all the way to the face of the iris 13, and take a group delay vs. frequency plot. This provides the zero phase reference. Set the phase meter of the Vector Voltmeter 32 to zero.

5. Set the sweeper 38 to manual operation, and adjust the frequency to the high end of the band of interest.

Figure 7:
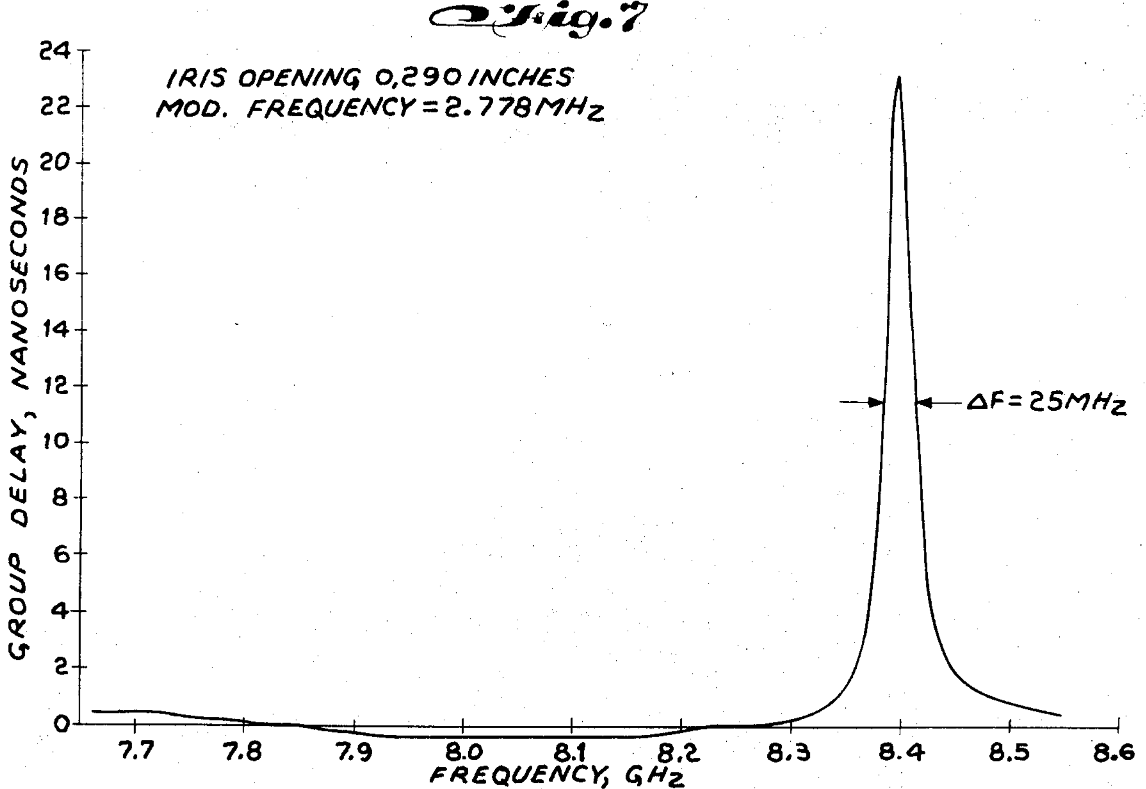
FIG. 7 is a graphical representation of the group delay vs. frequency plot of the test cavity of FIG. 6B.

6. Move the short 12 out until the Vector Voltmeter phase meter peaks. The reading of the meter in degrees should be converted to group delay (if modulation frequency is 2.778 MHz, 1° = 1 ns). Record the iris size, and group delay. Also make a group delay vs. frequency plot. See FIG. 7. $\tau_{max}$ is consistent with $\Delta F$ according to equations (3–6).

7. Repeat the above with differing iris openings 13*a*.

8. After completing the iris data, a curve should be drawn of iris size vs. group delay. Entering the curve at the maximum value of group delay desired and reading the iris size will provide the iris size to use for the cavity, with a tuning screw at the iris.

Figure 6A:
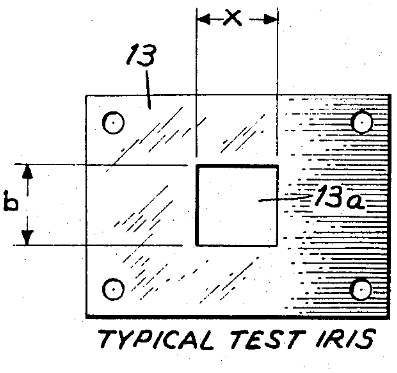
Figure 6D:
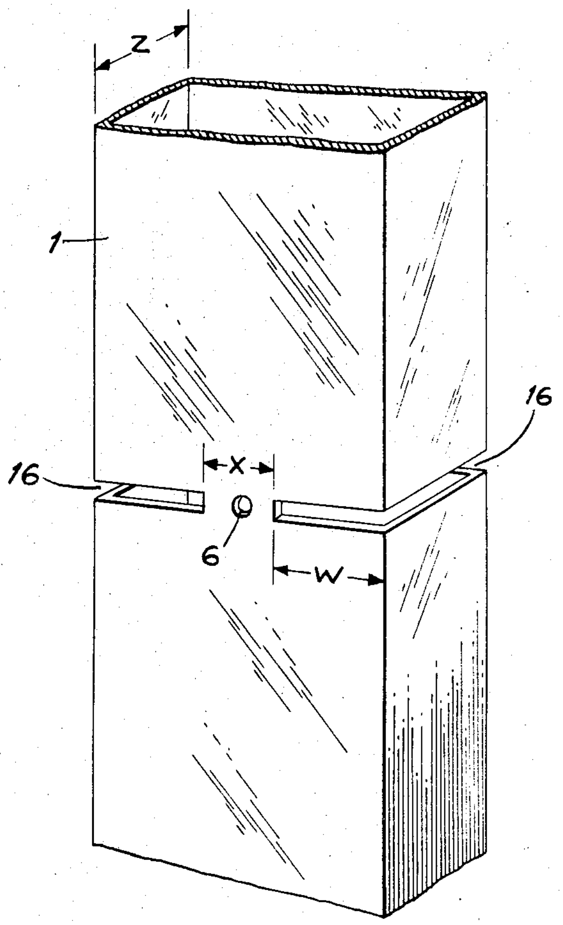
FIGS. 6C and 6D show in a top and a perspective view respectively an actual iris coupling construction and the waveguide arrangement for the mounting of such an iris therein.
Figure 6C:
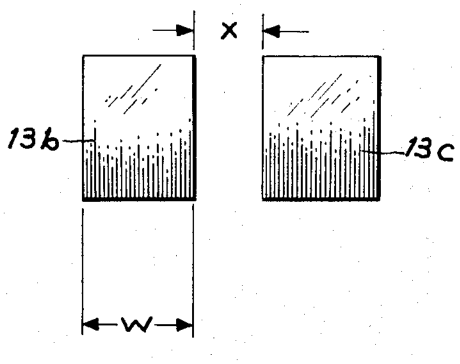

While the construction of the test irises under evaluation in the above is shown in FIG. 6A to be unitary, the preferred construction of the irises to be employed in the actual variable equalizer apparatus (as indicated in FIG. 4) is intended to be of two pieces 13*b* and 13*c* as shown in FIG. 6C. These two-piece irises are in actuality fitted into respective slits 16 oppositely cut into the waveguide 1 as indicated in FIG. 6D, and fixedly retained therein by soldering or other suitable means. In this way a desired iris opening of known dimensions is effected without the adjusting screw 6 having to interrupt or pass over the structure to permit an adjustment thereof in the plane of the iris opening. The screw assembly 6 is simply mounted in the side of the waveguide 1 between the two iris slits 16. The Z length dimension of the opening of each iris is intended to remain fixed and equal to the minor dimension of the waveguide.

It may be easily seen that we are permitted to perform the above-described testing of typical iris openings by way of unitarily-constructed irises inasmuch as the testing is referenced to the iris condition wherein the screw is completely withdrawn, i.e., minimum coupling, which is equivalent to no screw adjustment at all and hence a one-piece iris construction. Direct testing in this way is greatly facilitated by accurately "clamping" the test iris securely between the two parallel flanges 11 and 14, wherein no significant losses or other undesirable electrical phenomena are experienced. The dimension W corresponds to the depth of each slit 16 in the waveguide 1. The slits in FIG. 6D are of course exaggerated for clarity.

Figure 8:
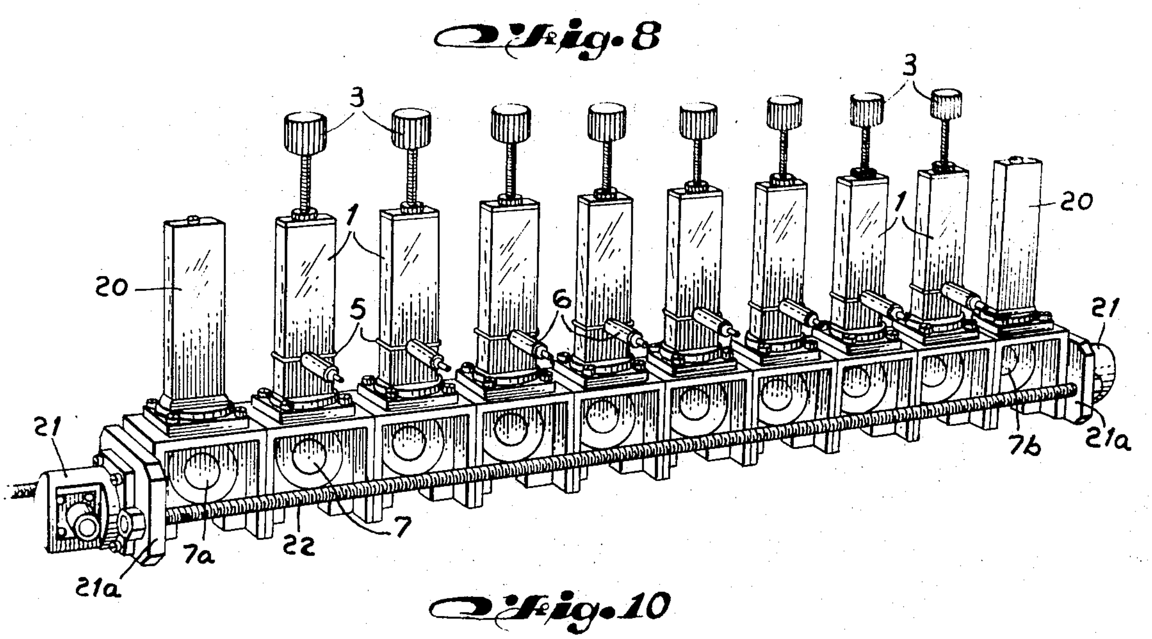
FIG. 8 illustrates in perspective an eight-cavity, 10-circulator variable equalizer arrangement according to the invention.

A variable equalizer may be constructed by assembling a number of delay sections (as shown in FIG. 4) in tandem. This enables one to dispose a number of group delay responses of varying height and frequency within a band to produce a desired delay shape. Such an equalizer has considerable versatility as will be apparent from the following. FIG. 8 illustrates an eight-cavity 2, 10-circulator 7 variable equalizer constructed in this fashion. The two outermost circulators 7*a* and 7*b* are used as isolators and are fitted with loads 20 on their middle ports rather than adjustable cavities. The circulators 7 must be coupled to each other without impairing their operation or damage. Such circulators are commercially available. Input and output couplings 21 are provided at either end of the chain of circulators 7. As part of the couplings, flanges 21*a* are added at either end, wherein holding means such as threaded bars 22 are used in conjunction therewith to maintain the individual sections as one securely maintained and through-coupled unit.

The total group delay of a number of cascaded circulator and cavity combinations is the sum of the individual group delays. However, because the circulators 7 used to interconnect the individual elements do not have infinite isolation, there is some signal that is not delayed. If the circulators have 30 db isolation then the untreated signal is minimized. Good circulators are available that have 30 db isolation across a 500 MHz band at *shf.*

Figure 9A:
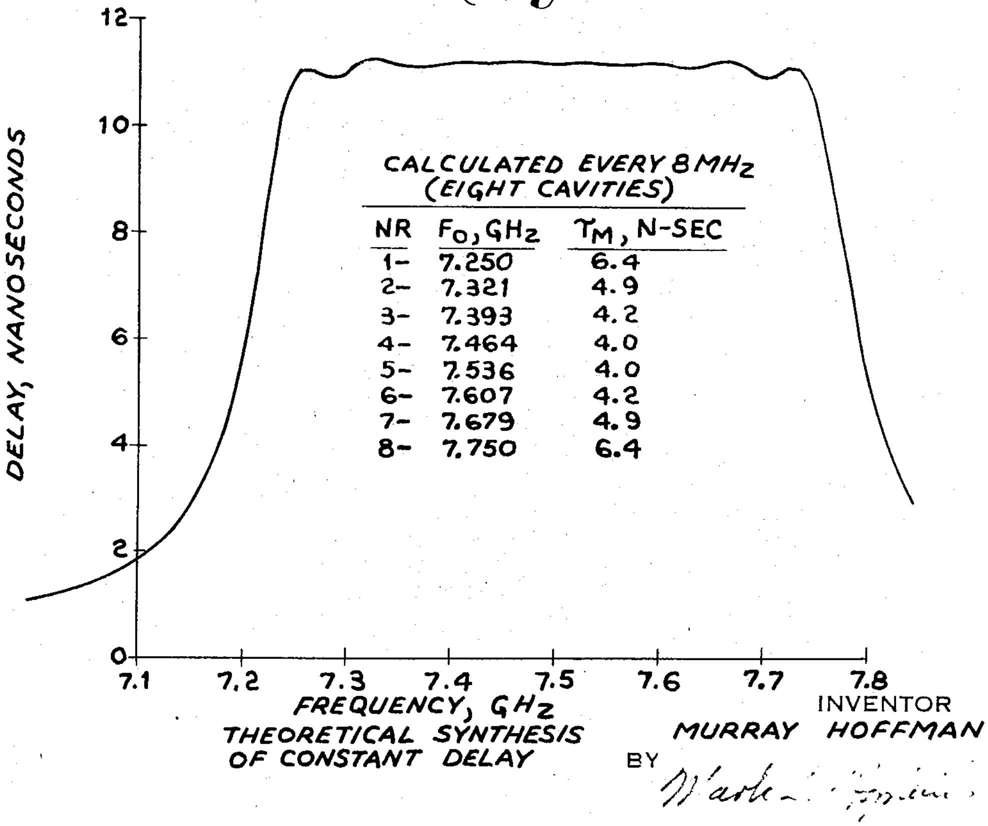
FIGS. 9A–9C graphically represent respectively the theoretical synthesis of constant delay, the separate cavity responses, and the sum of the cavity delays of the variable equalizer of FIG. 8.
Figure 9B:
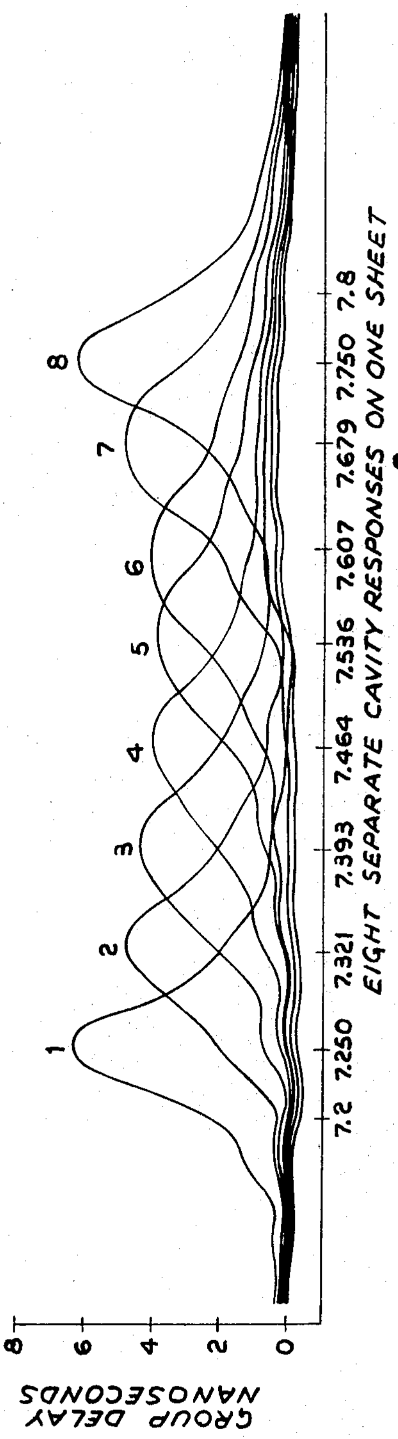

FIG. 9A is a theoretical square wave plot calculated for eight cascaded cavities, and each cavity is specified by its peak group delay and resonant frequency. Eight cavities of the type according to FIG. 4 may be aligned to the theoretical frequency and group delays of FIG. 9A. FIG. 9B is a measurement of the eight individual cavities superimposed on one sheet. The eight cavities interconnected as indicated in FIG. 8 provide the result shown in FIG. 9C. It is to be noted that this compares favorably with the theoretical results.

Figure 9C:
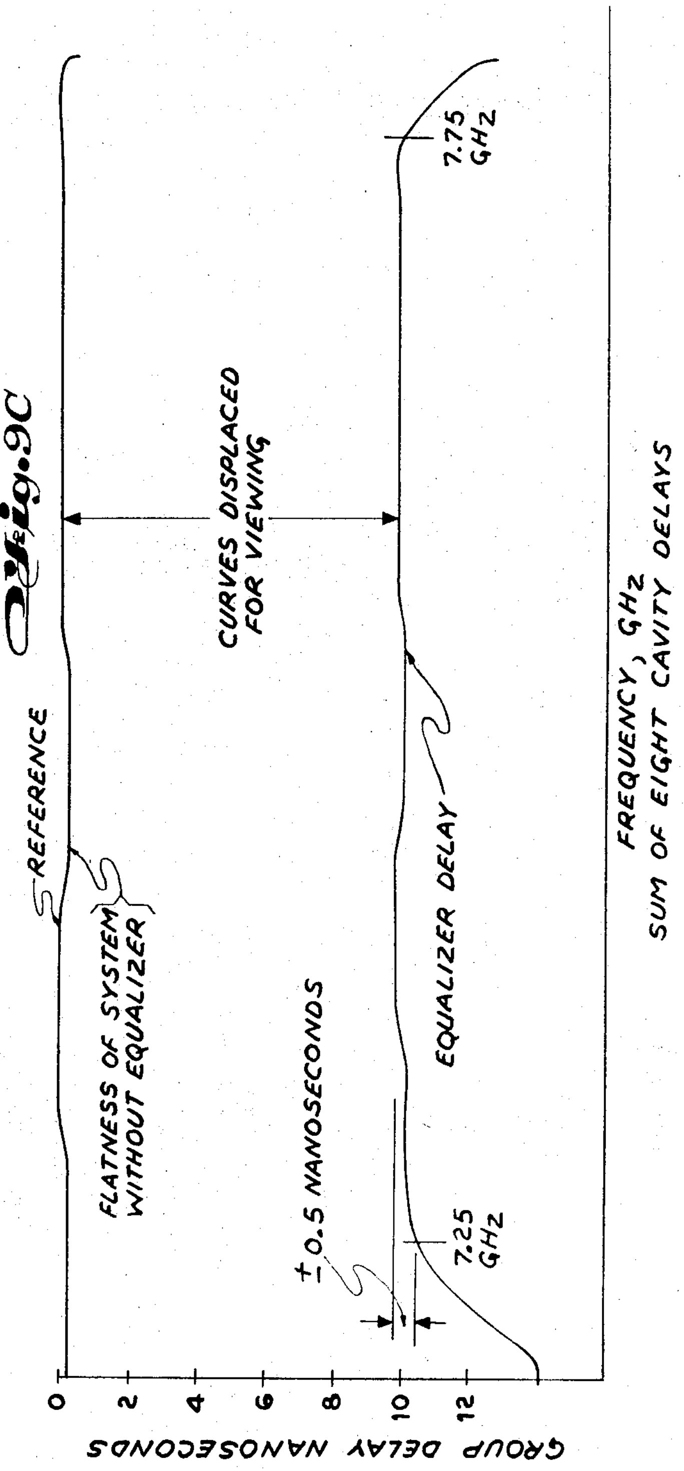

If N cavities 2 are to be used in a passband $F_p$, then the cavities are separated by $F_p/N$–1 Hz. FIGS. 9A–9C show that cavity contributions are independent, but the sum in any band contains a contribution from the response tails of the adjacent cavities.

Figure 10:
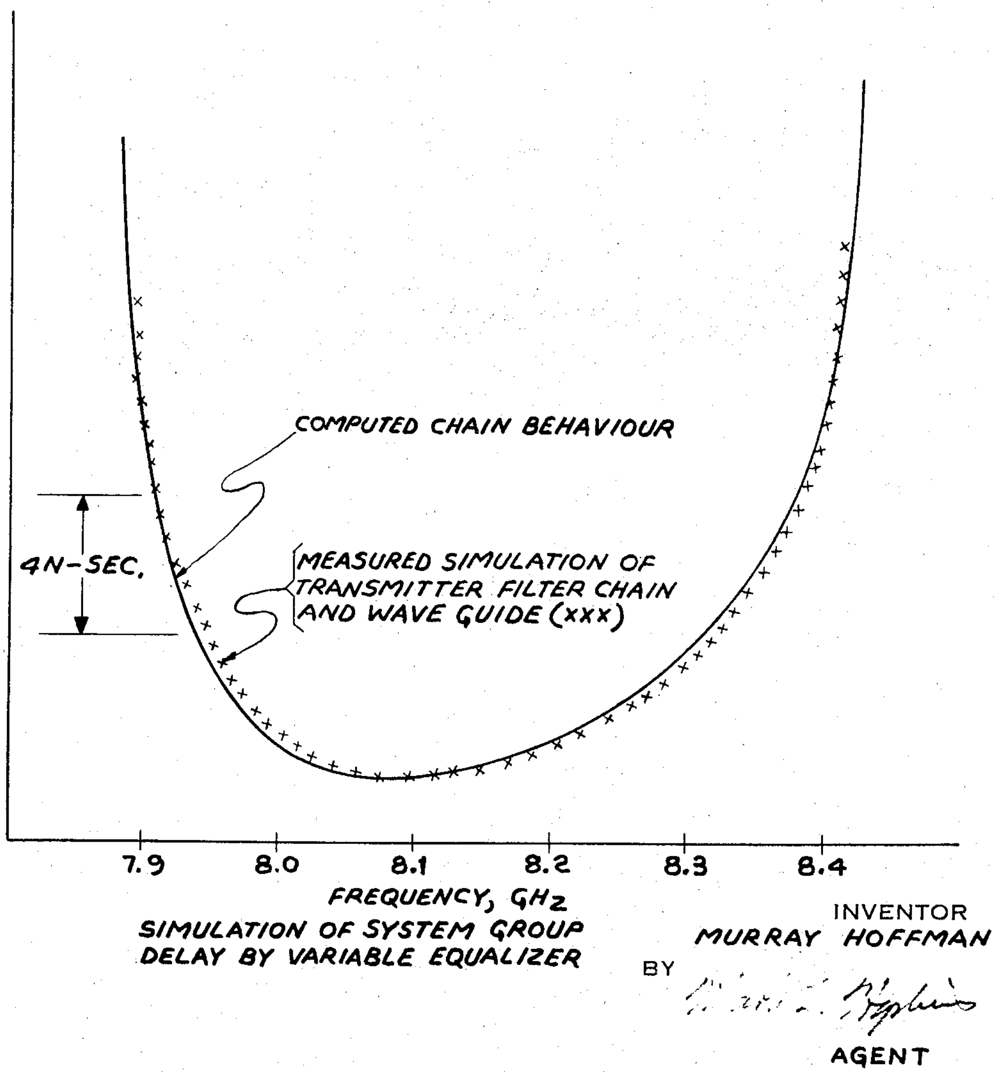
FIG. 10 graphically illustrates simulation of a system's group delay by a variable equalizer.

Another application of the variable equalizer is to simulate the group delay of a complete system chain, as shown graphically in FIG. 10. In one experimental example of this property, the group delays of the filters for a transmitter system were computed and are plotted as the solid line in FIG. 10. The chain contained a 13-pole 0.01 db Chebyschev up converter filter, an 11-pole 0.01 db Chebyschev power amplifier output filter, an 8-inch length of narrow waveguide which served as a high-pass filter, and 300 feet of EW–71 waveguide. The eight-cavity equalizer of FIG. 8 was then tuned to closely approximate the theoretical curve. The crosses in FIG. 10 are the measured non-linear group delay of the equalizer. The agreement is within 0.3 ns from 7.9 to 8.4 GHz.

The variable equalizer then represented the whole system in the laboratory; it is of course much more convenient to work with a single component than the whole system.

The inventive method for tuning a multi-sectional variable equalizer such as has been disclosed hereinbefore is demonstrated according to the following:

Pre-tuning procedure:

Using the group delay setup described with reference to FIG. 3, set the sweep, for example, to 7.25 to 7.75 GHz or 7.9 to 8.4 GHz. It is best to use a frequency counter.

Set the scope 33 to external sweep and adjust the external variable 10-1 pot so that the horizontal sweep is seven boxes if the equalizer is eight cavities or nine boxes if the equalizer is 10 cavities.

Each major graduation on the scope now corresponds to a specific cavity, as can be seen in the oscillograms comprising FIGS. 11A–11J.

In general:

Moving the tuning screw 6 (FIG. 4) down causes a group delay decrease and a frequency decrease.

Moving the tuning screw 6 up causes group delay increase, frequency increase.

Moving the short 4 (FIG. 4) in causes frequency increase, group delay decrease.

Moving the short out causes frequency decrease, group delay increase.

Tuning procedure:

1. Set the plungers 4 (i.e., the resonant frequency adjuster) of all the equalizer sections all the way out (i.e., lowest resonant frequency).

2. Set all screws 6 (i.e., the iris coupling screws) of all the equalizer sections all the way down, (i.e., minimum coupling). A typical display is shown in the oscillogram, shown in FIG. 11A, titled Equalizer Shorted.

3. Set the screw 6 of the first cavity all the way out.

4. Move the plunger 4 in until a response is seen. See FIG. 11B.

5. Move the screw 6 down and the response will move to the left, and the amplitude (group delay) will decrease.

Figure 11A:
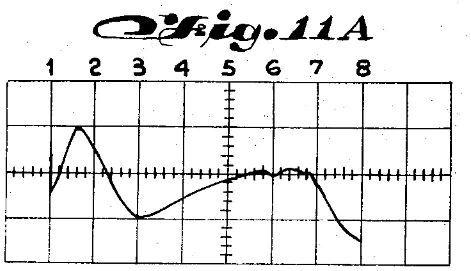
FIGS. 11A–11J graphically illustrate the tuning procedure and sequence of a multi-sectional variable equalizer according to the invention.
Figure 11B:
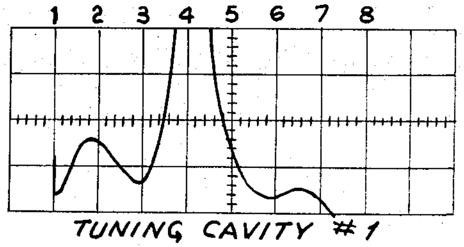
Figure 11C:
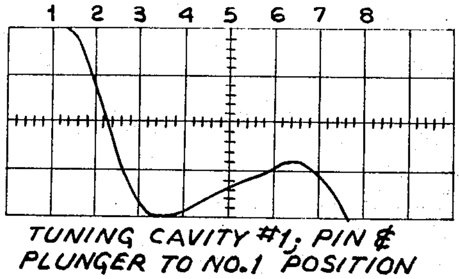
Figure 11D:
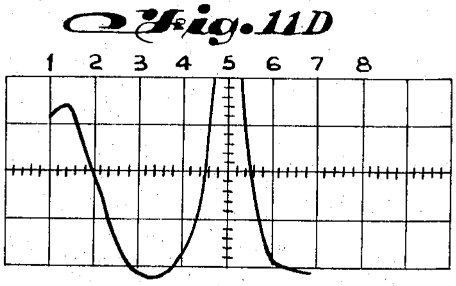
Figure 11E:
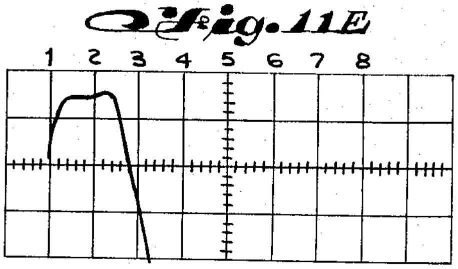

6. The object is to obtain the response on line No. 1 of the scope. To obtain this, keep adjusting the plunger 4 and screw 6. Note as the plunger goes in the response amplitude moves to the right; as the screw goes in the amplitude decreases and the response moves to the left. The desired result is shown in FIG. 11C.

7. Set the screw 6 of the second cavity all the way out.

8. Move the plunger 4 of the second cavity in until a response is seen. See FIG. 11D.

9. Tune the screw and plunger as in steps five and six above, to obtain a response from the second cavity at the number two position, i.e., adjacent and to the right of the first positioned cavity response. See FIG. 11E.

Figure 11F:
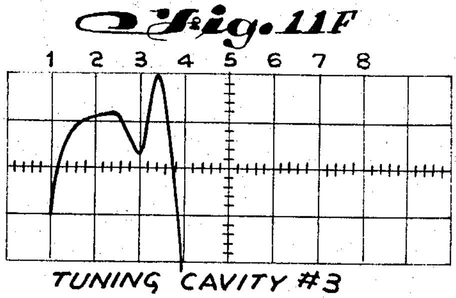

10. Repeat steps seven through nine above for each cavity. FIG. 11F illustrates the tuning of the third cavity.

Figure 11G:
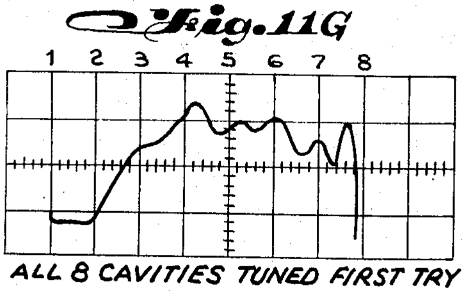

11. FIG. 11G shows the tuning of all eight cavities after the first try. It is now desirable to retune all cavities again, to bring the response to the average of the high and low points of the response. When retuning, first move the screw then the plunger, then screw then plunger, etc. until response is obtained.

12. If the response is too high, move the screw down, and then the plunger in. If the response is too low, move the screw up, and then the plunger out.

Figure 11H:
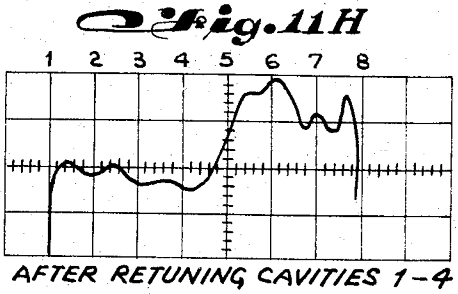

13. FIG. 11H shows the results after retuning the first four cavities.

Figure 11I:
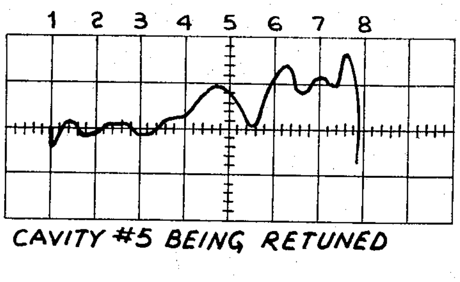

14. FIG. 11I shows for example the retuning of the fifth cavity.

Figure 11J:
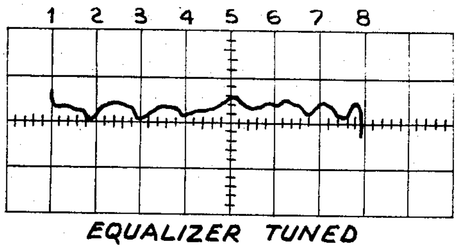

15. Further refinement may be obtained by repeating again the tuning procedure. FIG. 11J shows the final result.

There has been described in the above a novel variable equalizer and method for tuning a multi-sectional variable equalizer. The inventive arrangement comprises a cavity structure having substantially independent adjustable controls for resonant frequency and signal energy coupling thereto. The cavity is coupled to the middle port of a three-port circulator serving as a signal energy transmission line to the dual-controlled cavity. Many such sections may be cascaded to provide equalization of a system over an extremely wide range of operating frequencies.

While the principles of this invention have been described with specific apparatus and operating conditions, it is to be understood that the description is made by way of example only and not as a limitation on the scope of the invention as set forth in the objects and features thereof and in the appended claims.

I claim:

1. A method for tuning a multi-sectional variable equalizer to achieve a predetermined group delay response in a communication system over a broad band of operating frequencies, in which each section of the equalizer has first and second adjustment controls for substantially independently varying respectively the resonant frequency and signal energy coupling thereof, comprising the steps of:

a. adjusting said first and second controls of all said sections to predetermined reference settings;
b. setting said second adjustment control of a first equalizer section to a predetermined initial setting and varying the associated first adjustment control until a delay response therefrom is effected;
c. coarse tuning said first and second controls of said first section to effect said response thereof at a predetermined portion of the system operational frequency spectrum and to within a predetermined range of response levels;
d. repeating steps (b) and (c) above for each of the remaining sections of said multi-sectional equalizer such that each section is associated with a separate portion of the entire system operating frequency spectrum and within said predetermined range of response levels; and
e. fine tuning each of said sections to the desired collective response.

2. The method according to claim 1 wherein said reference settings of said first and scond controls of each said section constitute respectively lowest resonant frequency and minimum coupling of signal energy, and the intial setting of said second control of said first section constitutes a setting to maximum coupling, and wherein said first control of said first section is varied away from minimum after the setting of the associated second control to maximum to effect a response with the system spectrum.

3. The method according to claim 1 wherein each succeeding equalizer section to be tuned is adjusted to have the response thereof associated with the portion of the system frequency spectrum adjacent to that portion corresponding to the previously tuned section, and wherein each portion of the entire system operating frequency spectrum is associated to an equalizer section.

4. The method according to claim 1 wherein the tuning of each equalizer section to a predetermined portion of the system spectrum is effected within the predetermined range of response levels desired for that portion of the spectrum.

5. The method according to claim 4 wherein said fine tuning is provided to average the high and low portions of the collective response and thereby form a substantially flat response throughout the system operating frequency spectrum.

6. A variable equalizer comprising first means providing a rectangular cavity operatively coupled to a source of signal energy and having a longitudinal axis of symmetry, means for varying the resonant frequency of said cavity, said resonant frequency varying means including a sliding short arranged within said rectangular cavity to be controllable from one end thereof and to be movable longitudinally along said axis from said one end for varying the cavity size, and means for varying in a continuous manner the coupling of the signal energy to said cavity, said means for varying the coupling of the signal energy to said cavity including an iris coupling with an adjusting screw arranged to be externally position-adjustable within the plane of the iris opening, said means for varying the resonant frequency and said means for varying the coupling providing substantially independent variable control of said equalizer, wherein said first means is coupled to circulator means, with said circulator means being part of a transmission line for the signal energy coupled to said first means, and said circulator means being coupled to said rectangular cavity at the end of said cavity opposite said frequency varying means relative to said longitudinal axis, and wherein said means for varying the coupling of the signal energy to said cavity are positioned within the portion of said cavity proximate said circulator means.

7. The variable equalizer according to claim 6 wherein said first means includes a plurality of cavities, each having individual means associated therewith providing said substantially independent variable controls, each of said cavities being coupled in one-to-one correspondence to a plurality of circulators, the latter being coupled directly in cascade to form a transmission line for signal energy.

* * * * *